US009242647B2

(12) United States Patent
Tsimhoni et al.

(10) Patent No.: US 9,242,647 B2
(45) Date of Patent: Jan. 26, 2016

(54) DISPLAY SYSTEMS AND METHODS FOR AUTONOMOUS VEHICLES

(71) Applicant: GM GLOBAL TECHNOLOGY OPERATIONS LLC, Detroit, MI (US)

(72) Inventors: Omer Tsimhoni, Ramat Hasharon (IL); Asaf Degani, Raanana (IL); Charles A. Green, Canton, MI (US); Jeremy A. Salinger, Southfield, MI (US); David M. Zande, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/162,173

(22) Filed: Jan. 23, 2014

(65) Prior Publication Data

US 2014/0222277 A1 Aug. 7, 2014

Related U.S. Application Data

(60) Provisional application No. 61/761,301, filed on Feb. 6, 2013.

(51) Int. Cl.
*B60W 30/00* (2006.01)
*G01C 21/36* (2006.01)

(52) U.S. Cl.
CPC ........... *B60W 30/00* (2013.01); *G01C 21/3697* (2013.01)

(58) Field of Classification Search
CPC ........................... B60W 30/00; G01C 21/3697

USPC ............................................................ 701/23
See application file for complete search history.

(56) References Cited

U.S. PATENT DOCUMENTS

| 7,974,783 | B2 * | 7/2011 | Seehaus et al. ............... 701/300 |
|---|---|---|---|
| 2005/0030184 | A1 * | 2/2005 | Victor ........................... 340/576 |
| 2007/0203617 | A1 * | 8/2007 | Haug .................................. 701/1 |
| 2012/0022716 | A1 * | 1/2012 | Kitahama et al. .................. 701/1 |
| 2012/0083960 | A1 * | 4/2012 | Zhu et al. ......................... 701/23 |
| 2013/0179023 | A1 * | 7/2013 | Schmidt ................. G05D 1/021 701/23 |

FOREIGN PATENT DOCUMENTS

DE 10 2009 033 752 * 1/2011

* cited by examiner

*Primary Examiner* — Fadey Jabr
*Assistant Examiner* — Aaron L Troost
(74) *Attorney, Agent, or Firm* — Ingrassia Fisher & Lorenz, P.C.

(57) ABSTRACT

Methods and control systems are provided for automatically controlling operation of a vehicle. In one embodiment, the control system includes an exterior sensor for sensing the environment outside the vehicle. A processor is in communication with the exterior sensor and configured to calculate a driving plan of the vehicle based at least partially on the sensed environment outside the vehicle. The processor is also configured to calculate a confidence level of the driving plan of the vehicle based at least partially on the sensed environment around the vehicle. The control system also includes a display in communication with the processor and configured to receive data from the processor and display a representation of at least one of the driving plan and the confidence level.

17 Claims, 8 Drawing Sheets

FIG. 18

DISPLAY SYSTEMS AND METHODS FOR AUTONOMOUS VEHICLES

CROSS REFERENCE TO RELATED APPLICATIONS

This application claims the benefit of U.S. Provisional Application No. 61/761,301, filed Feb. 6, 2013, which is hereby incorporated by reference.

TECHNICAL FIELD

The technical field generally relates to automatic control of a vehicle and more specifically to displays and methods associated with automatic control of a vehicle.

BACKGROUND

Control systems and associated methods have been developed to provide automatic, or autonomous, control of vehicles, such as automobiles. These systems and methods allow for the vehicle to drive itself on the roadway, using various sensors to identify the roadway, navigate on the roadway, and avoid collision with other vehicles.

Such systems are typically able to switch between at least an automatic mode, in which a computing device controls operation of the vehicle, and a manual mode, in which the driver controls the vehicle. When errors occur in the automatic operation of the vehicle, the control system may need to switch over, or be switched over by the driver, to manual mode. Often, this switchover can occur with little warning to the driver. Other times, the driver must determine when the system is in error and cause the switch to manual driving.

Accordingly, it is desirable to provide a control system and method which informs the driver as to the operation of the control system in automatic mode. Furthermore, other desirable features and characteristics of the present invention will become apparent from the subsequent detailed description and the appended claims, taken in conjunction with the accompanying drawings and the foregoing technical field and background.

SUMMARY

A control system is provided for automatically controlling operation of a vehicle. In one exemplary embodiment, the control system includes an exterior sensor for sensing the environment outside the vehicle. A processor is in communication with the exterior sensor and configured to calculate a driving plan of the vehicle based at least partially on the sensed environment outside the vehicle. The processor is also configured to calculate a confidence level of the driving plan of the vehicle based at least partially on the sensed environment around the vehicle. The control system also includes a display in communication with the processor and configured to receive data from the processor and display a representation of at least one of the driving plan and the confidence level.

A method is provided for automatically controlling operation of a vehicle. In one exemplary embodiment, the method includes sensing the environment outside the vehicle. The method also includes calculating a driving plan of the vehicle based at least partially on the sensed environment outside the vehicle. A confidence level of the driving plan of the vehicle is calculated based at least partially on the sensed environment around the vehicle. The method further includes displaying a representation of at least one of the driving plan and the confidence level.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
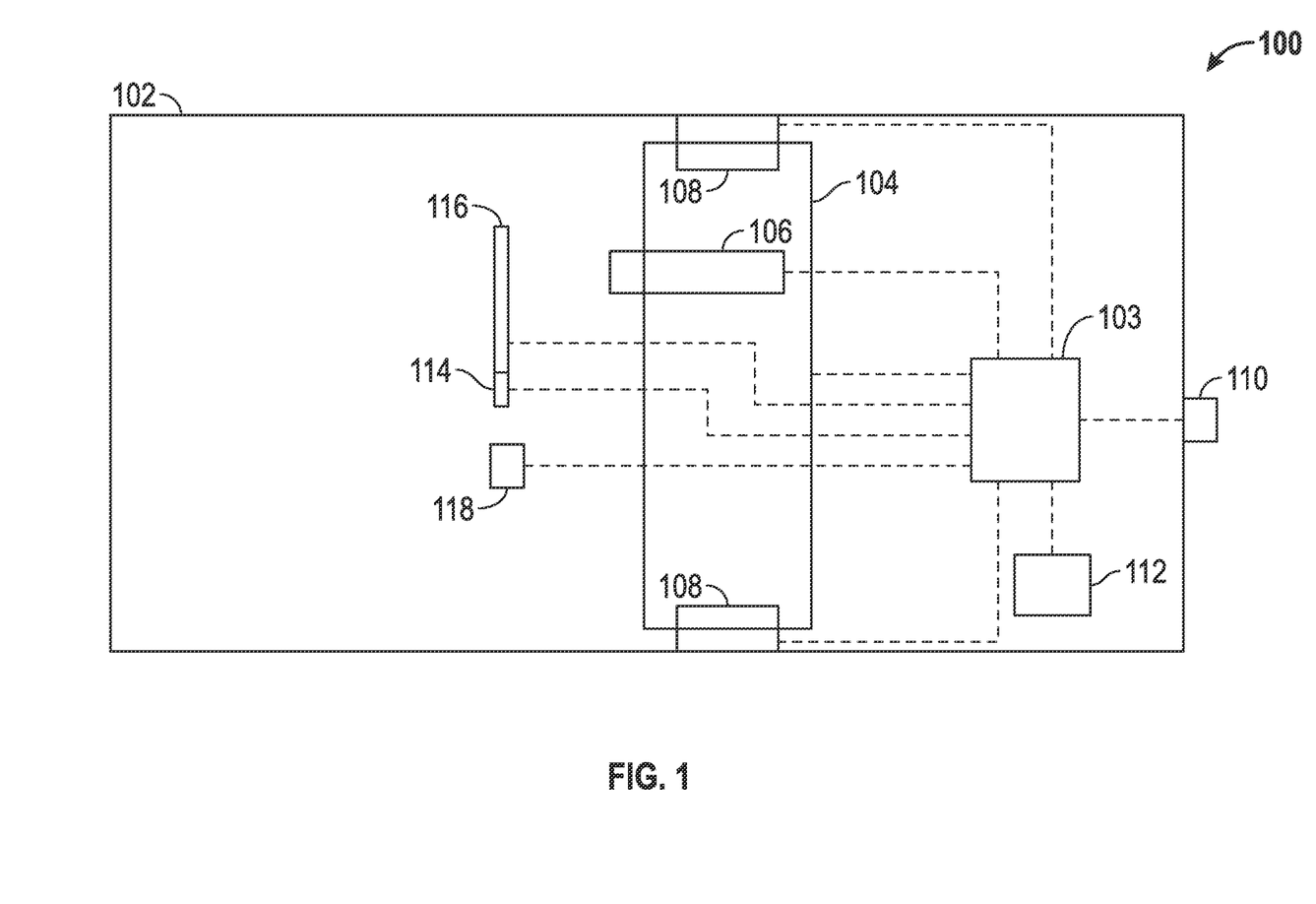
FIG. 1 is a block diagram of a control system of a vehicle in accordance with an embodiment.

Referring to the Figures, wherein like numerals indicate like parts throughout the several views, a control system 100 for the automatic operation of a vehicle 102 is shown herein. The vehicle 102 of the exemplary embodiments is an automobile (not separately numbered). However, the control system 100 may be utilized with other vehicles as appreciated by those skilled in the art.

The control system 100 of the exemplary embodiments includes a processor 103 capable of performing calculations and executing program instructions. The processor 103 may be a microprocessor, microcontroller, application specific integrated circuit ("ASIC"), or other suitable device.

The vehicle 102 includes a powertrain 104 for propulsion. The powertrain 104 may include, for example, an engine (not shown) (e.g., an internal combustion engine or an electric motor), a transmission (not shown), and drive wheels (not shown), as is well appreciated by those skilled in the art. The vehicle 102 also includes a steering mechanism 106 for controlling the direction of travel of the vehicle 102. The vehicle 102 may further include a braking arrangement 108 for slowing and stopping the vehicle 102. The powertrain 104, steering mechanism 106, and braking arrangement 108 are shown only in block form and without further detailed description, as embodiments of these mechanisms are varied and well known to those skilled in the art.

The control system 100 is in communication with the powertrain 104, the steering mechanism 106, and the braking arrangement 108 for automatically controlling operation of these mechanisms 104, 106, 108, and, as such, operation of the vehicle 102. More specifically, the processor 103 is in communications with the powertrain 104, the steering mechanism 106, and the braking arrangement 108. The processor 103 executes one or more programs and, in accordance with the one or more programs, controls operation of the powertrain 104, the steering mechanism 106, and the braking arrangement 108. For instance, the processor 103 may cause the vehicle 102 to accelerate, decelerate, maintain a velocity, turn, and/or stop. Furthermore, those skilled in the art will appreciate other aspects of operating the vehicle 102 that may be controlled by the processor 103 and/or the control system 100.

The control system 100 includes at least one exterior sensor 110. The at least one exterior sensor 110 senses the environment outside the vehicle. For instance, the at least one exterior sensor 110 may sense the roadway, markings on the roadway, other vehicles or objects near the vehicle 102, and/or road signs. In the exemplary embodiments, the control system 100 includes a plurality of exterior sensors 110. The exterior sensors 110 may be cameras, RADAR sensors, ultrasonic transducers, or other suitable sensing mechanisms as appreciated by those skilled in the art.

The control system 100 of the exemplary embodiments further includes a global positioning system ("GPS") receiver 112. The GPS receiver 112 is capable of determining a location of the vehicle 102. Specifically, the GPS receiver 112 determines the location of the vehicle 102 on Earth by receiving signals from a plurality of satellites in orbit and computing the position based on differences in the signals, as is well known.

The processor 103 is in communication with the exterior sensor(s) 110. As such, the processor 103 receives data from the exterior sensor(s) 110 associated with the environment outside the vehicle 102. The processor 103 utilizes this data to determine the location of the roadway, markings on the roadway (e.g., lane dividers), the location of other vehicles or objects near the vehicle 102, the speed of other vehicles or objects, and/or road signs (e.g., speed limit signs, stop signs, do not enter signs, etc.).

Differing environmental conditions outside the vehicle 102 may affect the sensing distance of the exterior sensor(s) 110. For example, fog, precipitation, lack of illumination, and/or other factors may reduce the sensing distance. As such, the processor 103 of the illustrated embodiments is configured to determine a sensing distance based at least in part on the sensed environment outside the vehicle. That is, the processor 103 may determine how far each exterior sensor 110 can "see".

The processor 103 of the exemplary embodiments is also in communication with the GPS receiver 112. As such, the processor 103 receives data associated with the position of the vehicle 102 on the Earth.

The control system 100 of the exemplary embodiments also includes an input device 114 and a display 116, both in communication with the processor 103. The input device 114 receives input from a user, e.g., a driver of the vehicle 102. The input device 114 may be implemented as a keyboard (not separately shown), a microphone (not separately shown), a touchscreen layer associated with the display 116, or other suitable device to receive data and/or commands from the user. Of course, multiple input devices 114 may also be utilized.

Figure 2:
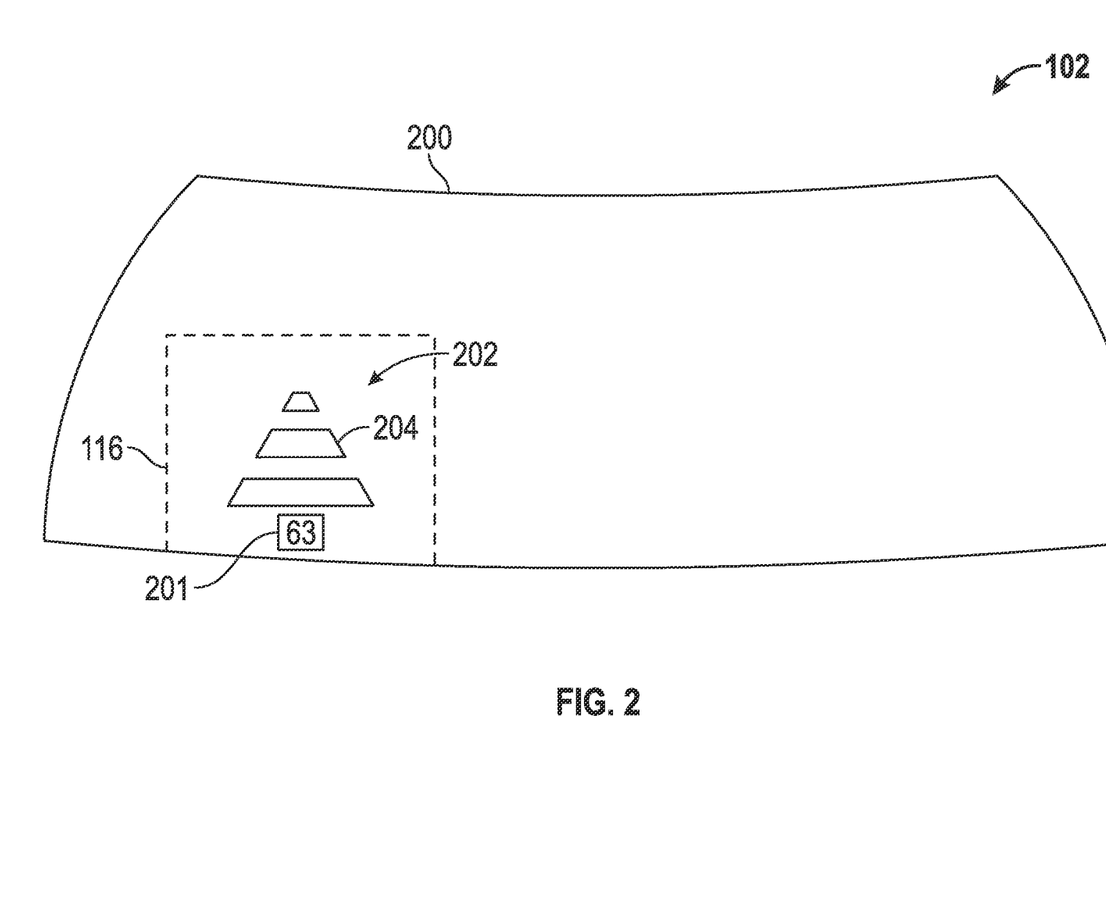
FIG. 2 is an interior view of a windshield with a head up display displaying a driving plan icon having a trajectory icon in accordance with an exemplary embodiment.
Figure 3:
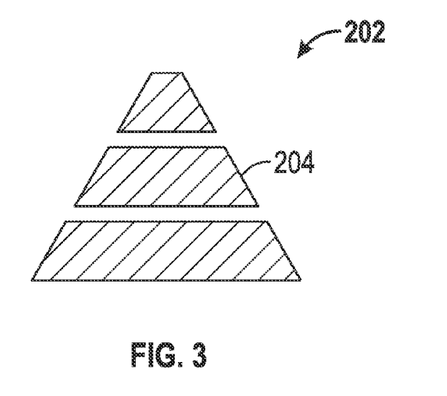
FIG. 3 is a view of the trajectory icon indicating the vehicle is on a straight trajectory in accordance with an exemplary embodiment.

The display 116 provides visual information to the driver and/or other users of the vehicle 102. In one embodiment, as shown in FIG. 2, the display 116 is implemented as a head up display ("HUD") (not separately numbered) projected or otherwise implemented on a windshield 200 of the vehicle 102. In other embodiments (not shown), the display 116 is implemented as a flat panel display in a console or dashboard of the vehicle 102. Those skilled in the art realize other techniques to implement the display 116 in the vehicle 102.

With reference again to FIG. 1, the control system 100 is configured to calculate a driving plan of the vehicle 102 based at least partially on the sensed environment outside the vehicle 102. More specifically, in the exemplary embodiments, the processor 103 is configured to calculate the driving plan of the vehicle 102 based at least partially on the sensed environment outside the vehicle 102. Even more specifically, the processor 103 is configured to calculate the driving plan of the vehicle 102 based at least partially on the sensed environment outside the vehicle 102 as supplied by the exterior sensors 110 and the location of the vehicle 102 as supplied by the GPS receiver 112. Said another way, the processor 103 determines the direction of travel, trajectory, speed, turning movements, lane-shifting movements, and other necessary "decisions" based on the sensed environment outside the vehicle 102 and the location of the vehicle 102. The processor 103 may also utilize a destination location, as provided by the user via the input device 114 or other techniques, in determining the driving plan of the vehicle 102.

As stated above, the processor 103 is in communication with and control of the powertrain 104, the steering mechanism 106, and the braking arrangement 108. As such, the powertrain 104, the steering mechanism 106, and the braking arrangement 108 may be controlled in accordance with the driving plan determined by the processor 103.

The control system 100 of the exemplary embodiments also includes an interior sensor 118. The interior sensor 118 may be implemented as a camera (not separately shown) configured to sense the driver of the vehicle 102. Of course, multiple interior sensors 114 may be utilized. Furthermore, interior sensors 114 other than the camera may be implemented.

The interior sensor 118 is in communication with the processor 103 such that a signal generated by the interior sensor 118, and data associated with that signal, is received by the processor 103. The processor 103 may then calculate an attention state of the driver, hereafter referred to an attentiveness state. For instance, the processor 103 may determine whether the driver is alert and paying attention to the roadway, whether the driver is alert and distracted, or whether the driver is asleep. Of course, other and/or different attention states may be calculated by the processor 103 based on the signal received by the processor 103 from the interior sensor 118.

The processor 103 of the exemplary embodiments is configured to calculate a confidence level of the driving plan and/or an overall performance of the control system 100. Said plainly, the confidence level is a value relating to how "secure" or "confident" the control system 100 is in predictions made regarding the driving plan of the vehicle. Numerous factors may be utilized in calculating the confidence level. These factors may include, but are not limited to, the sensing distance, the quality of markings on the roadway, a correlation (or lack of correlation) between the sensed environment and the location of the vehicle 102, reliability of signals received from the external sensor(s) 110, reliability of signals received from the GPS receiver 112, and/or attention state of the driver.

As stated above, the display 116 is configured to receive data from the processor 113 and display information to the driver and/or other users of the vehicle 102. For instance the display 116 may be utilized to display a speed 201 of the vehicle, as shown in FIG. 2. The display 116 may also be configured to display a representation of the driving plan, herein after referred to as a driving plan icon 202. A driving plan icon 202 is shown in FIG. 2 and other figures herein.

Figure 4:
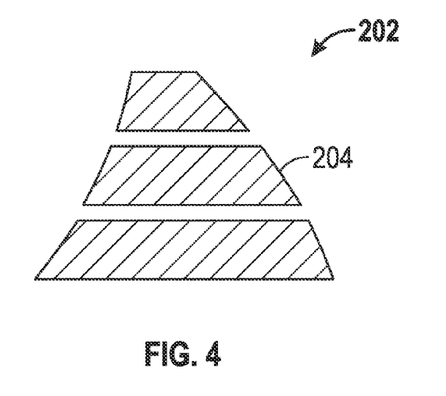
FIG. 4 is a view of the trajectory icon indicating the vehicle is heading to the left in accordance with an exemplary embodiment.
Figure 5:
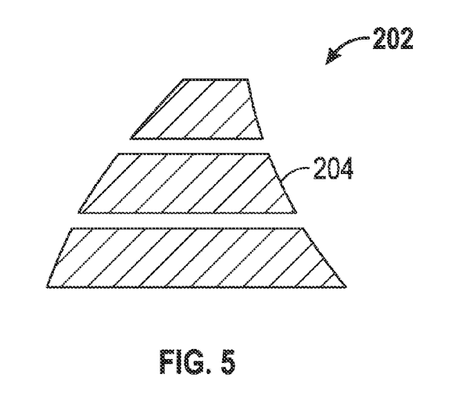
FIG. 5 is a view of the trajectory icon indicating the vehicle is heading to the right in accordance with an exemplary embodiment.

The driving plan icon 202 may include a trajectory icon 204. The trajectory icon 204 indicates the planned direction of travel, i.e., the planned trajectory, of the vehicle 102, as determined by the processor 103. The trajectory icons 204 shown in FIGS. 2-5 are each comprised of three trapezoids (not separately numbered). However, other numbers and shapes may be utilized for the trajectory icons 204. The trapezoids in the embodiment shown by FIGS. 2-5 may be skewed in one direction or another to indicate the planned trajectory of the vehicle 102. For instance, in FIG. 3, the trajectory icon 204 includes three isosceles trapezoids to indicate that the vehicle 102 is on a straight trajectory. In FIG. 4, the trajectory icon 204 includes three non-isosceles trapezoids skewed to the left to indicate that the vehicle 102 will be heading to the left. The trajectory icon 204 in FIG. 5 includes non-isosceles trapezoids skewed to the right indicating that the vehicle 102 will be heading to the right.

Figure 6:
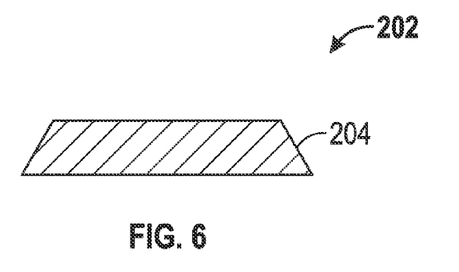
FIG. 6 is a view of the trajectory icon indicating a low sensing distance in accordance with an exemplary embodiment.
Figure 7:
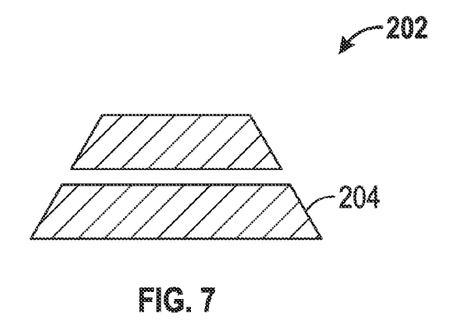
FIG. 7 is a view of the trajectory icon indicating a medium sensing distance in accordance with an exemplary embodiment.

The trajectory icon 204 may be utilized to convey information other than the trajectory of the vehicle 102. For instance, the number of trapezoids in the trajectory icon 204 may be dependent on one or more factors. In the exemplary embodiments shown in FIGS. 2-7, the number of trapezoids may be dependent on the sensing distance of the exterior sensor(s) 110. As an example, three trapezoids, as is shown in FIGS. 2-5, may be utilized for a long sensing distance, i.e., a sensing distance over a first predetermined value. With a short sensing distance, i.e., a sensing distance under a second predetermined value less than the first predetermined value, one trapezoid may be utilized as the trajectory icon 204, as shown in FIG. 6. With a medium sensing distance, i.e., a sensing distance between the first and second predetermined values, two trapezoids may be utilized, as shown in FIG. 7.

Figure 8:
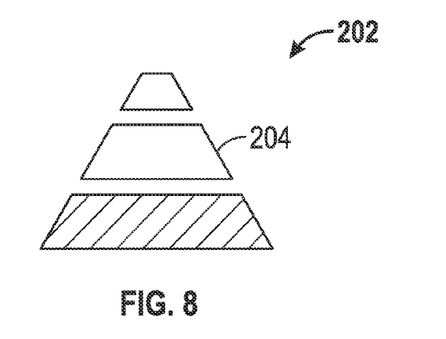
FIG. 8 is a view of the trajectory icon indicating a low confidence level in accordance with an exemplary embodiment.

In other embodiments (not shown), the number of trapezoids included in the trajectory icon 204 may indicate the confidence level. However, in some embodiments, the confidence level is conveyed to the driver or other user by the whether the trapezoids are "filled" or "hollow". For instance, if all three trapezoids are filled, then the trajectory icon 204 indicates a high confidence level. If two of the trapezoids are filled and one trapezoid is hollow, then the trajectory icon 204 indicates a medium confidence level, less than the high confidence level. If one of the trapezoids is filled and two trapezoids are hollow, as particularly shown in FIG. 8, then the trajectory icon 204 indicates a low confidence level. Of course, alternate shading, coloring, or other techniques of presentation may be utilized to convey confidence level to the driver or other user.

By communicating the sensing distance and/or the confidence level to the driver of the vehicle 102, the driver is informed as to the functionality of the automatic operation of the vehicle 102 by the control system 100. Particularly, this information may alert the driver to an upcoming need to take over operation of the vehicle 102 from an automatic mode to a manual mode. In one instance, this may allow the driver to prevent the control system 100 from inadvertently driving the vehicle 102 inappropriately. In another instance, this can reduce the alarm felt by the driver when the control system 100 requests such a takeover by the driver. Moreover, by integrating the communication of the sensing distance and/or the confidence level into the trajectory icon 204, the display 116 is less cluttered and less distracting to the driver.

Figure 9:
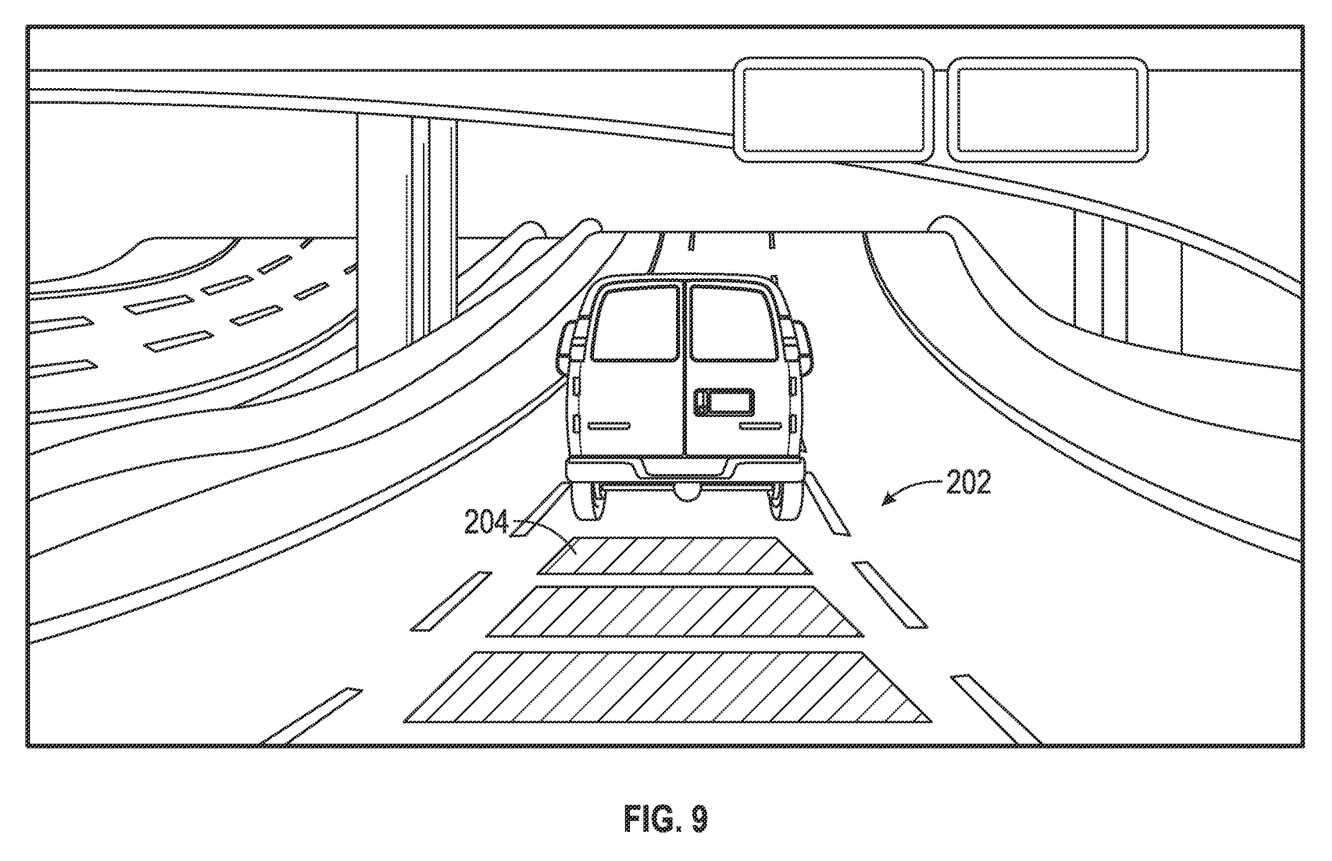
FIG. 9 is a view of the trajectory icon on a head up display being conformal with a lane of a roadway in accordance with an exemplary embodiment.

In a HUD, the trapezoids of the driving plan icon 202 may be sized and positioned to be generally conformal with the driving lanes of the roadway, as shown in FIG. 9, from the perspective of the driver of the vehicle 102. As such, the driver may more easily see the planned direction of travel of the vehicle 102, as trapezoids crossing the lane markers indicate a change of lanes. However, in other embodiments, the trapezoids may not be conformal with the lanes of the roadway.

Figure 10:
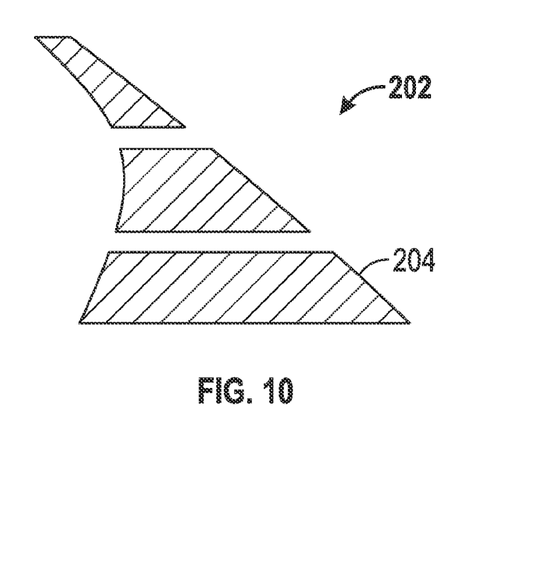
FIG. 10 is a view of the trajectory icon indicating an acceleration of the vehicle in accordance with an exemplary embodiment.
Figure 11:
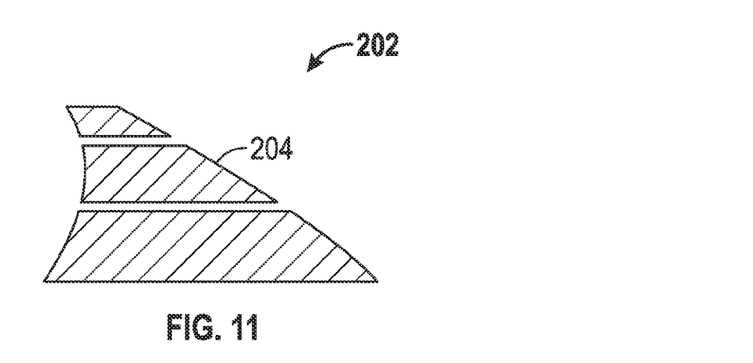
FIG. 11 is a view of the trajectory icon indicating the vehicle holding a generally constant speed in accordance with an exemplary embodiment.
Figure 12:
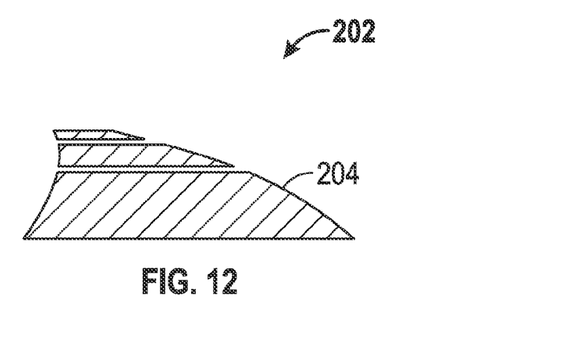
FIG. 12 is a view of the trajectory icon indicating a deceleration of the vehicle in accordance with an exemplary embodiment.

The driving plan icon 202 may also be utilized to convey the change in speed of the vehicle 102. In the exemplary embodiments shown in FIGS. 10-12, a height of each trapezoid represents a distance traveled in about two seconds, when displayed conformally on a HUD. As such, the driving plan icon 202 shown in FIG. 10 illustrates an accelerating vehicle 102, FIG. 11 illustrates the vehicle 102 at a constant speed, and FIG. 12 illustrates a decelerating vehicle 102. Of course, in alternate embodiments, the height of each trapezoid may represent different distances traveled in different time periods.

Figure 13:
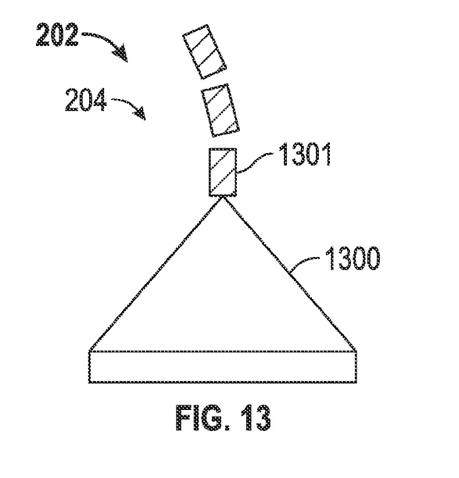
FIG. 13 is a view of a trajectory icon indicating a high confidence level, a high sensing distance, and that the vehicle is heading to the left in accordance with an exemplary embodiment.
Figure 14:
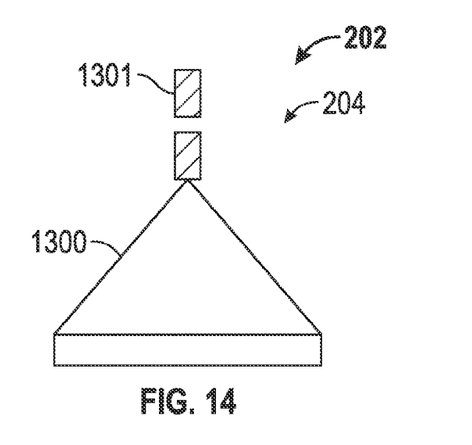
FIG. 14 is a view of a trajectory icon indicating a medium sensing distance in accordance with an exemplary embodiment.
Figure 15:
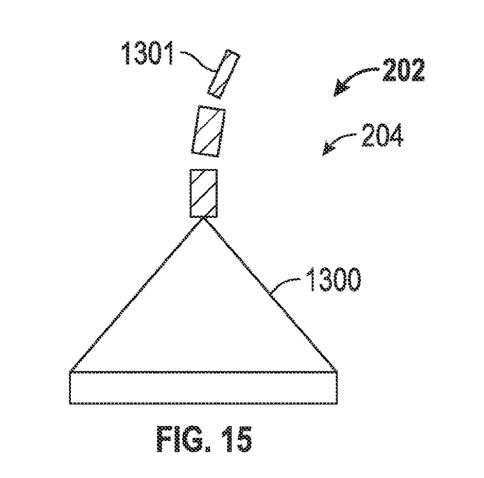
FIG. 15 is a view of a trajectory icon indicating a medium confidence level, a high sensing distance, and that the vehicle is heading to the right in accordance with an exemplary embodiment.

The trajectory icon 204 may be implemented without the trapezoids shown in FIGS. 2-12. For example, FIGS. 13-15 illustrate the trajectory icon 204 with a triangle 1300 and dashed line segments 1301. However, other shapes, e.g., the shape of the vehicle, could alternately be utilized. The trajectory icon 204 in FIG. 13 includes three segments 1301 veering to the left, with each segment 1301 having a wide width. Specifically, the veering to the left of the segments 1301 indicates that the vehicle 102 will be heading to the left, the presence of three segments 1301 indicates a high sensing distance, and the wide width of the three segments 1301 indicates a high confidence level. The trajectory icon 204 in FIG. 14 includes two segments 1301 with a straight alignment, with each segment 1301 having a wide width. The use of two segments 1301, instead of three, indicates a medium sensing distance, and the wide width of the two segments 1301 indicates a medium confidence level. The driving plan icon 102 in FIG. 15 includes three segments 103 veering to the right, with two segments 1301 having a wide width and one segment 1301 having a narrow width. Specifically, the veering to the right of the segments 1301 indicates that the vehicle 102 will be heading to the right and the use of three segments 1301 indicates a high sensing distance. However, one segment 1301 having a narrow width indicates a medium confidence level.

In another exemplary embodiment (not shown), the trajectory icon 204 may be implemented with a plurality of segments arranged to resemble roadway markings. For example, the trajectory icon 204 may include two solid lines mimicking side lane markers of a roadway sandwiching a dashed line mimicking a center lane divider. Certain segments may be changed in opacity and/or color based on the confidence level. Furthermore, the lines produced by the segments may be curved to match the curves of the roadway.

Figure 16:
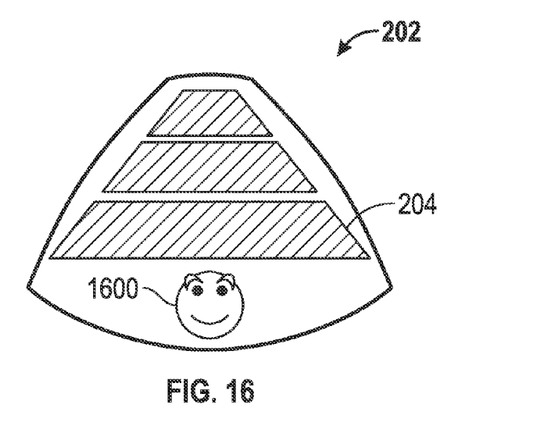
FIG. 16 is a view of a driving plan icon with a trajectory icon and an attentiveness icon indicating an attentive driver in accordance with an exemplary embodiment.
Figure 17:
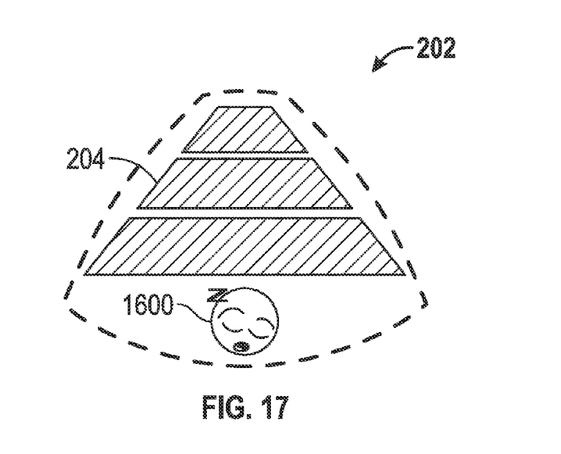
FIG. 17 is a view of a driving plan icon with a trajectory icon and an attentiveness icon indicating an asleep driver in accordance with an exemplary embodiment.
Figure 18:
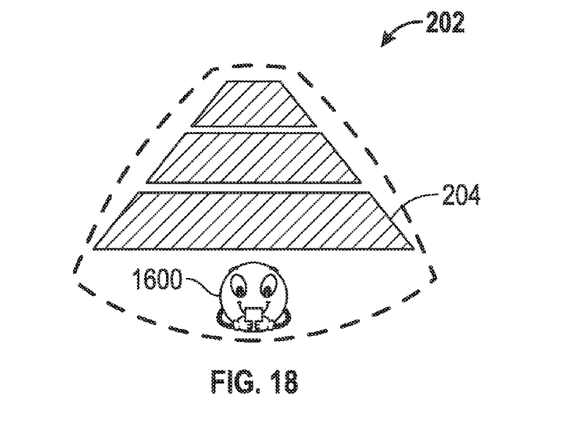
FIG. 18 is a view of a driving plan icon with a trajectory icon and an attentiveness icon indicating a distracted driver in accordance with an exemplary embodiment.

As stated above, the processor 103 and the interior sensor 118 are configured to calculate an attentiveness state of the driver. In one exemplary embodiment of the control system 100, the display is further configured to display the attentiveness state of the driver as part of the driving plan icon 202. This attentiveness state may be represented with an attentiveness icon 1600, as presented in the exemplary embodiments of FIGS. 16-18. Specifically, FIG. 16 indicates that the driver is attentive to the operation of the vehicle 102 and/or the roadway. FIG. 17 indicates that the driver may be asleep. FIG. 18 indicates that the driver is awake, but distracted from the operation of the vehicle 102. Of course, the attentiveness icons 1600 shown in FIGS. 16-18 are merely exemplary in nature and other techniques for presenting the attentiveness state of the driver may be utilized.

By displaying the attentiveness icon 1600 to the driver of the vehicle 102, the driver is informed as to whether the control system 100 has detected that the driver is being attentive or not, which can affect the confidence level. For instance, if the driver is attentive to the operation of the vehicle 102, but the display 116 of the control system 100 indicates that the driver is inattentive, then the driver may better understand why the control system 100 is requesting a takeover of the vehicle 102 from automatic to manual operation. Furthermore, the driver may be alerted to the need to obtain service to the control system 100. Also, when a driver who had been looking away from the road for some time is trying to hand over control to the vehicle 102 to the control system 100, the driver may better understand when the control system 100 is ready to take over control of the vehicle 102. Moreover, the driver may learn from the attentiveness icon 1600 what the system 100 considers as the driver's inattentiveness.

While multiple exemplary embodiments have been presented in the foregoing detailed description, it should be appreciated that a vast number of further variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of automatically controlling operation of a vehicle, said method comprising:
   sensing the environment outside the vehicle using at least one external sensor;
   calculating a driving plan of the vehicle based at least partially on the sensed environment outside the vehicle;
   automatically controlling the vehicle in accordance with the driving plan;
   determining a measurable sensing distance based at least in part on the sensed environment outside the vehicle;
   calculating a confidence level of the driving plan of the vehicle based at least partially on reliability of data received from the at least one external sensor and at least partially on the measurable sensing distance; and
   displaying a representation of the confidence level.

2. A method as set forth in claim 1 further comprising displaying a representation of the driving plan.

3. A method as set forth in claim 1 further comprising sensing a driver of the vehicle and calculating an attentiveness state of the driver.

4. A method as set forth in claim 3 further comprising displaying a representation of the attentiveness state of the driver.

5. A method as set forth in claim 1 further comprising displaying a representation of the measurable sensing distance.

6. A method as set forth in claim 1 further comprising determining a location of the vehicle with a global positioning system ("GPS") receiver and wherein said calculating a driving plan of the vehicle is based at least partially on the sensed environment outside the vehicle and the location of the vehicle.

7. A control system for automatically controlling operation of a vehicle, said system comprising:
   an exterior sensor for sensing the environment outside the vehicle;
   a processor in communication with said exterior sensor and configured to calculate a driving plan of the vehicle based at least partially on the sensed environment outside the vehicle, automatically control operation of the vehicle in accordance with the driving plan, determine a measurable sensing distance based at least in part on the sensed environment outside the vehicle and to calculate a confidence level of the driving plan of the vehicle based at least partially on reliability of data received from the exterior sensor and at least partially on the measurable sensing distance; and
   a display in communication with said processor and configured to receive data from said processor and display a representation of the confidence level.

8. A control system as set forth in claim 7 wherein said display is configured to display a representation of the driving plan.

9. A control system as set forth in claim 7 further comprising a GPS receiver for determining a location of said vehicle and wherein said control system is configured to calculate a driving plan of said vehicle based at least partially on the sensed environment around said vehicle and the location of said vehicle.

10. A control system as set forth in claim 7 further comprising an interior sensor for sensing a driver of said vehicle and wherein said control system calculates an attentiveness state of the driver.

11. A control system as set forth in claim 10 wherein said display is configured to display a representation of the attentiveness state of the driver.

12. A vehicle, comprising:
a powertrain for propelling said vehicle;
a steering mechanism for controlling the direction of travel of said vehicle;
a control system in communication with said powertrain and said steering mechanism for automatically controlling operation of said vehicle;
said control system including an exterior sensor for sensing the environment around said vehicle;
said control system including a processor in communication with said exterior sensor and configured to calculate a driving plan of said vehicle based at least partially on the sensed environment around said vehicle, to determine a measurable sensing distance based at least in part on the sensed environment outside the vehicle and to calculate a confidence level of the driving plan of said vehicle based at least partially on reliability of data received from the exterior sensor and at least partially on the measurable sensing distance; and
said control system including a display in communication with said processor and configured to receive data from said processor and display a representation of the confidence level.

13. A vehicle as set forth in claim 12 wherein said display is configured to display a representation of the driving plan.

14. A vehicle as set forth in claim 12 wherein said display is configured to display a representation of the measurable sensing distance.

15. A vehicle as set forth in claim 12 wherein said control system further includes a GPS receiver for determining a location of said vehicle and wherein said control system is configured to calculate a driving plan of said vehicle based at least partially on the sensed environment around said vehicle and the location of said vehicle.

16. A vehicle as set forth in claim 12 wherein said control system further includes an interior sensor for sensing a driver of said vehicle and wherein said control system calculates an attentiveness state of the driver.

17. A vehicle as set forth in claim 16 wherein said display is configured to display a representation of the attentiveness state of the driver.

* * * * *